US 6,657,817 B2

(12) United States Patent
Morita

(10) Patent No.: US 6,657,817 B2
(45) Date of Patent: Dec. 2, 2003

(54) CASSETTE HOUSING CASE HAVING AN ENGAGEMENT RECESS AND ONE OR MORE ENGAGEMENT PROTRUSIONS

(75) Inventor: Kiyoo Morita, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 182 days.

(21) Appl. No.: 09/955,170

(22) Filed: Sep. 19, 2001

(65) Prior Publication Data
US 2002/0034046 A1 Mar. 21, 2002

(30) Foreign Application Priority Data
Sep. 19, 2000 (JP) .......................... 2000/283126

(51) Int. Cl.[7] .......................... G11B 33/00; G11B 23/04
(52) U.S. Cl. .................... 360/132; 206/307; 206/387.1
(58) Field of Search ............................. 360/132, 133, 360/137; 206/387.1, 307, 308.1

(56) References Cited

U.S. PATENT DOCUMENTS

| 4,089,414 A | * | 5/1978 | Sandor et al. ............. 206/308.3 |
| 4,492,417 A | * | 1/1985 | Saito et al. ................. 312/9.42 |
| 4,703,853 A | * | 11/1987 | Byrns ..................... 206/387.13 |
| 5,209,424 A | * | 5/1993 | Fischer et al. .............. 242/348 |
| 5,366,073 A | * | 11/1994 | Turrentine et al. ........... 206/309 |
| 5,539,599 A | * | 7/1996 | Wilder ....................... 360/133 |
| D381,645 S | * | 7/1997 | Johnson ..................... D14/121 |
| 5,704,474 A | * | 1/1998 | Oland ...................... 206/308.1 |
| 5,819,929 A | * | 10/1998 | Chung ..................... 206/308.1 |
| 6,525,907 B1 | * | 2/2003 | Takahashi et al. ........... 360/132 |
| 2002/0063075 A1 | * | 5/2002 | Morita .................... 206/387.1 |

FOREIGN PATENT DOCUMENTS

| JP | 48-70535 | * | 9/1973 |
| JP | 8-119362 A | * | 5/1996 |
| JP | 11-48295 | | 2/1999 |
| JP | 11-328921 A | * | 11/1999 |
| JP | 2000-11594 A | * | 1/2000 |
| JP | 2000-168877 | | 6/2000 |
| JP | 2001-114377 | | 4/2001 |

* cited by examiner

Primary Examiner—Jefferson Evans
(74) Attorney, Agent, or Firm—Sughrue Mion, PLLC

(57) ABSTRACT

A cassette housing case for regulating positional shift, having an engagement recess and an engagement protrusion. The engagement recess is formed in the top surface of the cassette housing case and has a pattern which is asymmetrical with respect to at least either a first center line drawn on the top surface in parallel with a reference surface, or a second line drawn on the top surface which bisects the first center line in a direction perpendicular to the first center line. The engagement protrusion is formed in the bottom surface and has a corresponding pattern engageable with the engagement recess.

12 Claims, 3 Drawing Sheets

1

CASSETTE HOUSING CASE HAVING AN ENGAGEMENT RECESS AND ONE OR MORE ENGAGEMENT PROTRUSIONS

BACKGROUND OF THE INVENTION

1. Field of the Invention

The present invention relates to a cassette housing case for housing a magnetic tape cassette (also called a magnetic tape cartridge) in which a single reel with magnetic tape wound thereon is rotatably housed within a cassette case with similar longitudinal and transverse dimensions.

2. Description of the Related Art

A magnetic tape cassette in which a single reel with magnetic tape wound thereon is rotatably housed in a flat cassette case having a generally square flat form, and a magnetic disk cassette in which a disk is rotatably housed in a flat cassette case having a generally square flat form, have recently been used as storage media to back up data stored on memory for computers.

These cassettes are usually housed in their dedicated cassette housing cases when not being used, such as when being conveyed, when being archived, etc. In addition, the cassette is provided with a recording member, such as a bar code, a memory chip, etc., for identifying the recorded contents. It is important to provide a transparent portion (label area) in the cassette housing case and house the cassette in the cassette housing case in a fixed direction so that the recording member, such as a bar code, etc., can be read even in the housed state.

Furthermore, in order to enable transfer, transportation, and conveyance with a plurality of cassette housing cases stacked atop each other, the cassette housing cases are generally provided with a structure for regulating positional shift between the cassette housing cases when stacked. For instance, each cassette housing case is provided on the bottom surface with a protrusion and on the top surface with a recess. When a plurality of said housings are stacked together, the protrusion is fitted into the recess to regulate positional shift therebetween.

However, the engagement recess and protrusion in the top and bottom surfaces of the conventional cassette housing case are usually formed so that the lateral dimension and the vertical dimension differ from each other. When an upper cassette housing case is horizontally rotated through 90° from a correct engagement position with respect to a lower cassette housing case, they cannot engage each other. However, when an upper cassette housing case is horizontally rotated through 180° from a correct engagement position with respect to a lower cassette housing case, in many cases they engage each other. Because of this, there is a problem that the label areas of a plurality of cassette housing cases stacked together will not always be facing the same direction.

In addition, most of the cassettes are similar in longitudinal and transverse dimensions, and it is troublesome to identify the longitudinal and transverse lengths of a cassette and house the cassette into a housing case in a fixed direction. Because of this, there is another problem that housing of a cassette in an incorrect direction will disable reading of the aforementioned recording member at the label area.

The present invention has been made in view of the problems found in the prior art. Accordingly, it is a first object of the present invention to provide a cassette housing case which comprises an engagement recess and an engagement protrusion having patterns so that when a plurality of cassette housing cases are stacked together, the label areas of the cassette housing cases and the recording members of the cassettes are disposed in the same direction. A second object of the present invention is to provide a cassette housing case that is capable of preventing a cassette from being housed in an incorrect direction.

SUMMARY OF THE INVENTION

To achieve the first object of the present invention mentioned above, there is provided a first cassette housing case for regulating positional shift, comprising an engagement recess and an engagement protrusion. The engagement recess is formed in one of the top and bottom surfaces of the cassette housing case. The engagement recess has a pattern which is asymmetrical with respect to at least either a first center line drawn in the one surface in parallel with a reference surface, or a second line drawn on the one surface which bisects the first center line in a direction perpendicular to the first center line. The engagement protrusion is formed in the other of the top and bottom surfaces and has a corresponding pattern engageable with the engagement recess.

The reference surface used herein means, for example, a surface provided with a label area.

To achieve the second object of the present invention mentioned above, there is provided a second cassette housing case for regulating positional shift, comprising:

an engagement recess formed in one of top and bottom surfaces of the cassette housing case and having a pattern which is asymmetrical with respect to at least either a first center line drawn in the one surface in parallel with a reference surface, or a second line drawn on the one surface which bisects the first center line in a direction perpendicular to the first center line;

an engagement protrusion formed in the other of the top and bottom surfaces and having a corresponding pattern engageable with the engagement recess; and a mark, provided on the top surface of the housing case, for indicating a direction in which a cassette is housed within the cassette housing case.

In the second cassette housing case, the indicating mark can be formed as a substantially triangular mark etched in the top surface of the housing case. The patterns of the engagement recess and protrusion can be also formed as substantially triangular shapes. In addition, it is preferable that the cassette housing case employ transparent or semi-transparent material.

According to the first cassette housing case of the present invention, the engagement recess in one of the top and bottom surfaces of the cassette housing case has a pattern which is asymmetrical with respect to at least either a first center line drawn in the one surface in parallel with a reference surface, or a second line drawn on the one surface which bisects the first center line in a direction perpendicular to the first center line. The engagement protrusion in the other of the top and bottom surfaces has a corresponding pattern engageable with the engagement recess. With these patterns, the engagement between the recess and the protrusion becomes possible only in a correction direction, so a plurality of cassette housing cases can be stacked with the respective label areas disposed in the same direction.

According to the second cassette housing case of the present invention, the top surface of the cassette housing case is provided with a mark indicating a direction in which the magnetic tape cassette is housed. This makes it possible to prevent a cassette from being housing in an incorrect direction. In addition, in the case where the cassette housing case has no label area, the same advantage can be obtained by employing a cassette housing case formed from transparent or semitransparent material.

BRIEF DESCRIPTION OF THE DRAWINGS

The present invention will be described in further detail with reference to the accompanying drawings wherein.

DESCRIPTION OF THE PREFERRED EMBODIMENTS

Figure 1A:
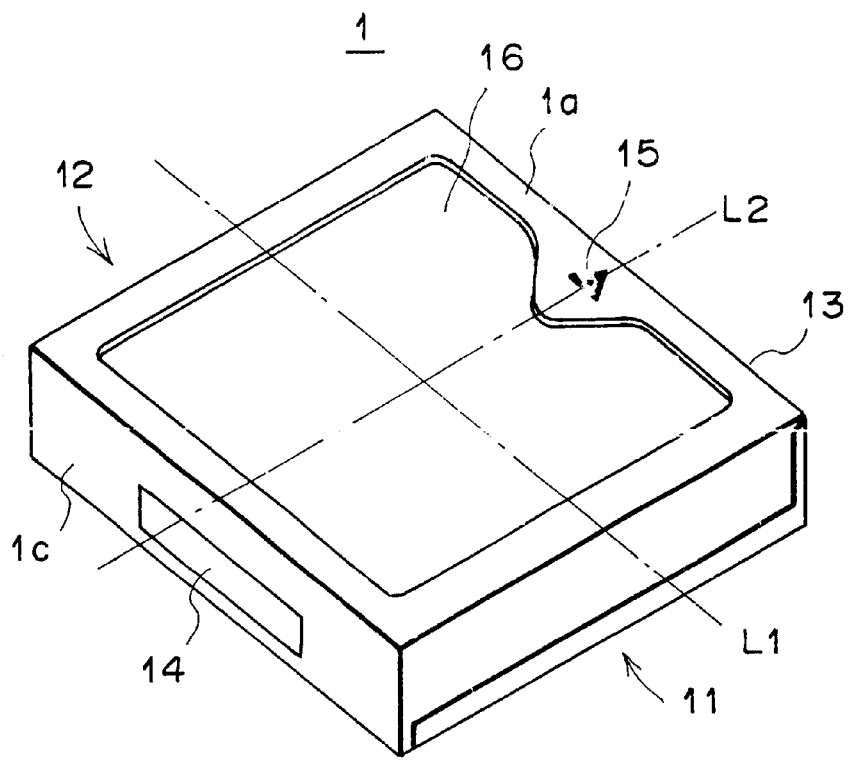
FIG. 1A is a perspective view of the top surface side of a cassette housing case according to a first embodiment of the present invention.

Referring to FIG. 1, there is shown a cassette housing case 1 in accordance with a first embodiment of the present invention. The cassette housing case 1 consists of a lower case main body 11 and an upper lid member 12. The lid member 12 is connected to the case main body 11 through a thin hinge portion 13 so that it can be freely opened and closed with respect to the main body 11. Within the cassette housing case 1, a magnetic tape cassette (not shown) is housed.

The top surface 1a of the cassette housing case 1 is formed by the top surface of the lid member 12, and the bottom surface 1b of the cassette housing case 1 is formed by the bottom surface of the case main body 11. A label area 14 is provided in a reference surface 1c, which is formed by the side surface, opposite to the hinge portion 13, of the lid member 12.

The top surface 1a of the housing case 1 shown in FIG. 1A has a substantially triangular mark 15 indicating a cassette-housing direction and also has an engagement recess 16 along the circumference of the housing case 1. The engagement recess 16 has a pattern which is asymmetrical with respect to a first center line L1 drawn on the top surface 1a in parallel with the reference surface 1c, but symmetrical with respect to a second center line L2 drawn on the top surface 1a which bisects the first center line L1 in a direction perpendicular to the first center line L1.

Figure 1B:
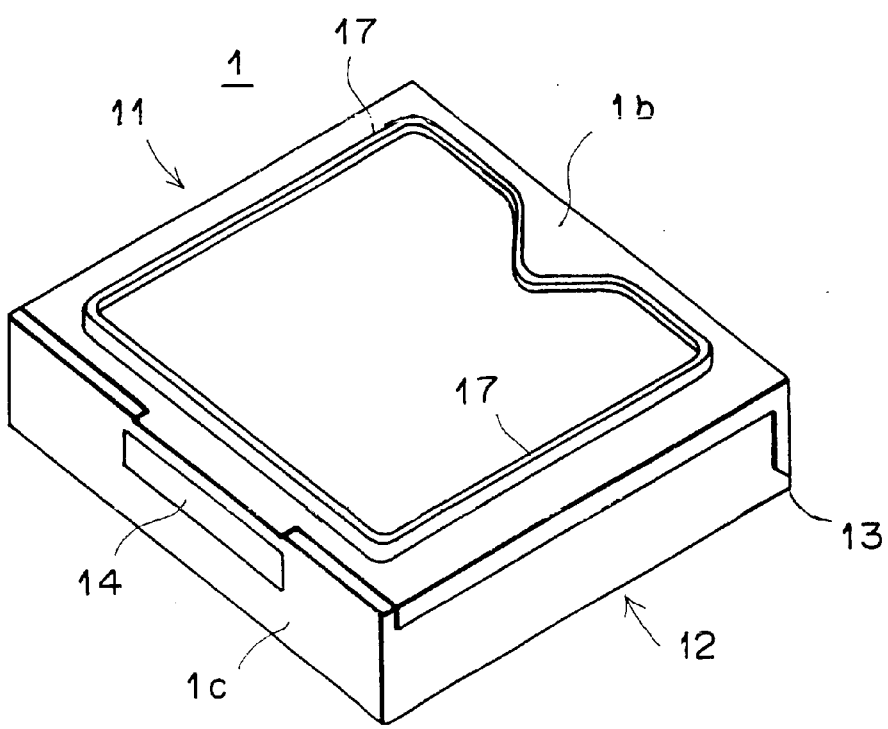
FIG. 1B is a perspective view of the bottom surface side of the cassette housing case shown in FIG. 1A.

On the other hand, the bottom surface 1b of the housing case 1 shown in FIG. 1B is provided with an engagement protrusion 17, which has a frame pattern approximately similar to the peripheral edge of the engagement recess 16 and is engageable with the engagement recess 16. The engagement protrusion 17, as with the engagement recess 16, has a corresponding pattern which is asymmetrical with respect to a first center line drawn on the bottom surface 1b in parallel with the reference surface 1c, but symmetrical with respect to a second center line drawn on the bottom surface 1b which bisects the first center line in a direction perpendicular to the first center line. Therefore, the engagement between the engagement recess 16 and the engagement protrusion renders it possible to regulate positional shift between housing cases 1 when they are stacked together. In addition, since an upper cassette housing case can engage with a lower cassette housing case only in a correct direction, a plurality of cassette housing cases 1 can be stacked together so that the respective label areas 14 are facing the same direction.

Figure 2:
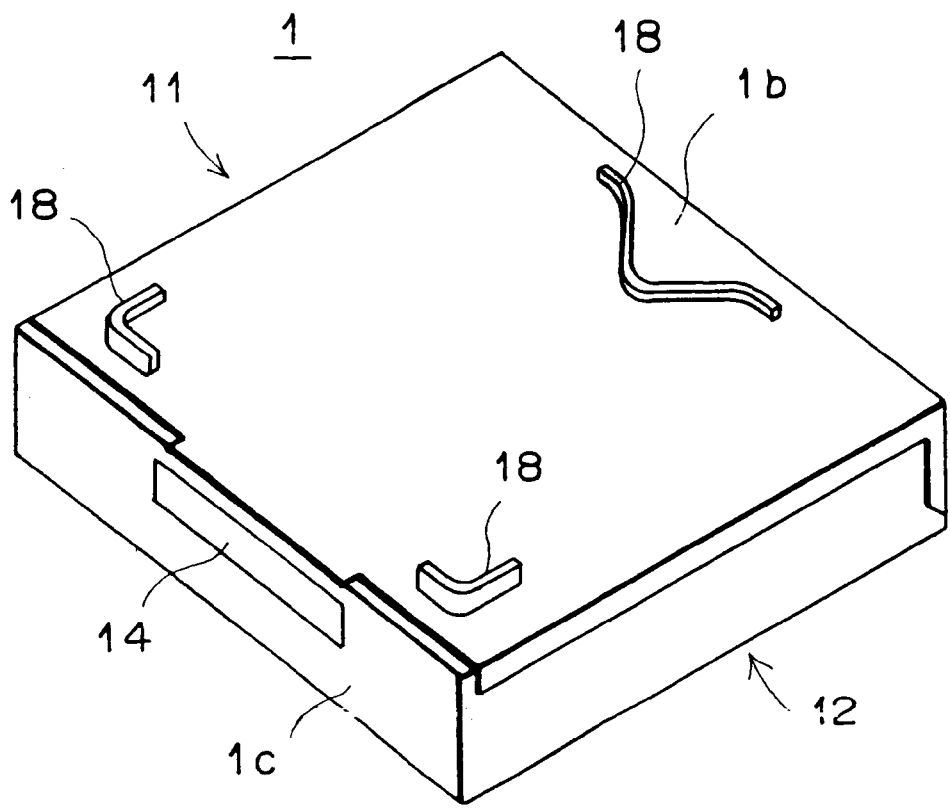
FIG. 2 is a perspective view of the bottom surface side of a cassette housing case according to a modification of the first embodiment.

Note that the engagement protrusion 17 of the bottom surface 1b of the housing case 1 is not limited to a continuous protrusion such as that shown in FIG. 1B. For instance, as shown in FIG. 2, it may be an engagement protrusion 18 consisting of a plurality of protruding portions, as long as it is asymmetrical with respect to a certain direction. Also, the engagement protrusion 17 may be asymmetrical with respect to the two center lines L1, L2. Furthermore, conversely, the engagement protrusion 17 may be provided on the top surface 1a of the housing case 1 and the engagement recess 16 on the bottom surface 1b.

Figure 3A:
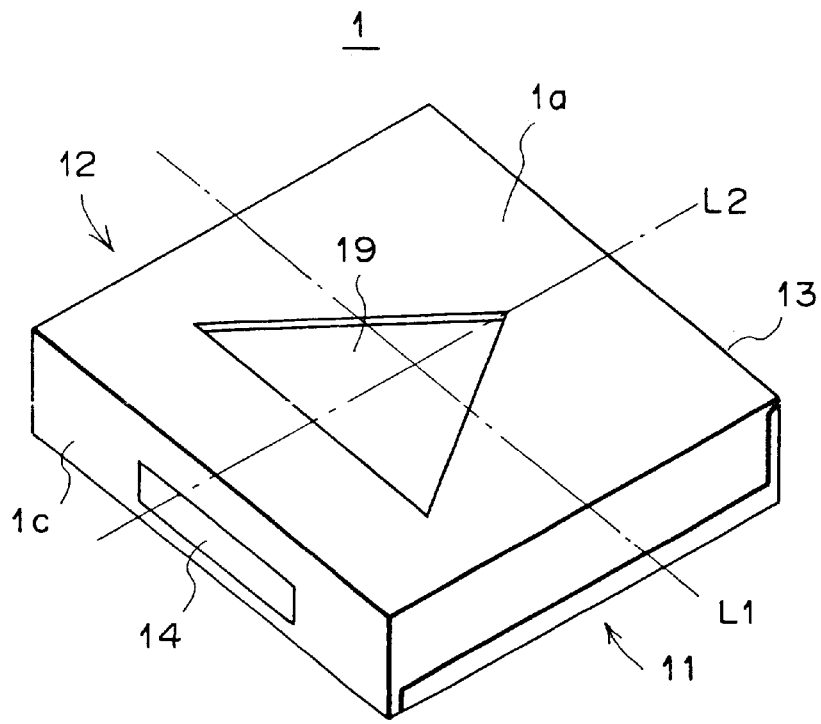
FIG. 3A is a perspective view of the top surface side of a cassette housing case according to a second embodiment of the present invention.
Figure 3B:
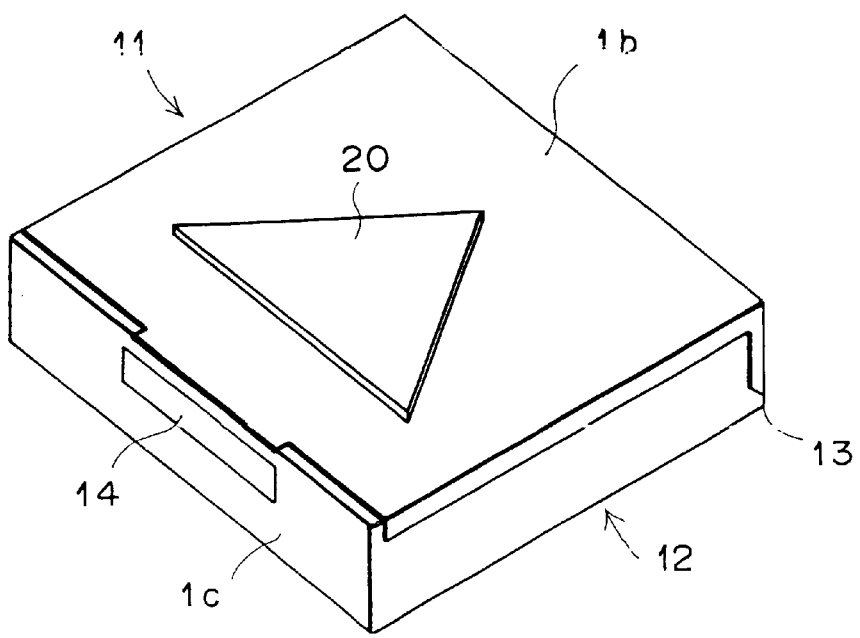
FIG. 3B is a perspective view of the bottom surface side of the cassette housing case shown in FIG. 3A.

FIGS. 3A and 3B illustrate a cassette housing case constructed according to a second embodiment of the present invention. In the second embodiment, the housing case 1 itself is the same in construction as the first embodiment, so the same reference numerals will be applied to corresponding parts for avoiding redundancy. As shown in FIG. 3A, a substantially triangular engagement recess 19 provided on the top surface 1a of the housing case 1 has a substantially triangular mark shape which indicates a direction in which a magnetic tape cassette is housed. The engagement recess 19, as with the first embodiment, has a pattern which is asymmetrical with respect to a first center line L1 drawn on the top surface 1a in parallel with a reference surface 1c, but symmetrical with respect to a second center line L2 drawn on the top surface 1a which bisects the first center line L1 in a direction perpendicular to the first center line L1. The bottom surface 1b of the housing case 1 is provided with a substantially triangular engagement protrusion 20 engageable with the triangular engagement recess 19, as shown in FIG. 3B.

Note that in the case where the substantially triangular shape is that of a substantially equilateral triangle, the engagement recess and protrusion 19, 20 can engage each other even when an upper housing case is horizontally rotated through 120° from its correct position. Therefore, it is preferable that the engagement recess and protrusion 19, 20 be substantially isosceles triangles. As with the first embodiment, they may be asymmetrical with respect to the two center lines L1, L2. Furthermore, the engagement protrusion 20 may be provided on the top surface 1a of the housing case 1 and the engagement recess 19 on the bottom surface 1b.

According to the present invention, as described above, the engagement recess and the engagement protrusion each have a pattern asymmetrical with respect to at least either the first center line L1 parallel to the reference surface 1c, or the second line L2 bisecting the first center line L1 in a direction perpendicular to the first center line L1. With this arrangement, a plurality of cassette housing cases can be stacked together with the respective label areas 14 facing the same direction. In addition, housing of a magnetic tape cassette in the housing case 1 in an incorrect direction can be prevented, because the top surface 1a of the housing case 1 has the triangular mark 15, or the triangular engagement protrusion 19, indicating a cassette-housing direction.

While the present invention has been described with reference to the preferred embodiments thereof, the invention is not to be limited to the details given herein, but may be modified within the scope of the invention hereinafter claimed.

What is claimed is:

1. A cassette housing case for regulating positional shift, comprising:

an engagement recess formed in one of top and bottom surfaces of said cassette housing case and having a pattern which is asymmetrical with respect to at least either a first center line drawn in said one surface in parallel with a reference surface, or a second line drawn on said one surface which bisects said first center line in a direction perpendicular to said first center line; and an engagement protrusion formed in the other of said top and bottom surfaces and having a corresponding pattern engageable with said engagement recess, wherein said reference surface is a side surface of said cassette housing case having a label area, such that when a plurality of cassette housing cases are stacked on top of each other, a label in said label area of each of said plurality of cassette housing cases faces the same direction.

2. The cassette housing case as set forth in claim 1, further comprising a label area.

3. The cassette housing case as set forth in claim 1, wherein said engagement protrusion comprises a plurality of protruding portions.

4. The cassette housing case as set forth in claim 1, wherein said cassette housing case is formed from transparent or semitransparent material.

5. A cassette housing case for regulating positional shift, comprising:

an engagement recess formed in one of top and bottom surfaces of said cassette housing case and having a pattern which is asymmetrical with respect to at least either a first center line drawn in said one surface in parallel with a reference surface, or a second line drawn on said one surface which bisects said first center line in a direction perpendicular to said first center line; and an engagement protrusion formed in the other of said top and bottom surfaces and having a corresponding pattern engageable with said engagement recess, wherein said engagement recess and said engagement protrusion are substantially triangular in shape.

6. The cassette housing case as set forth in claim 1, wherein said engagement recess and said engagement protrusion are each formed into the shape of a substantially isosceles triangle.

7. A cassette housing case for regulating positional shift, comprising:

an engagement recess formed in one of top and bottom surfaces of said cassette housing case and having a pattern which is asymmetrical with respect to at least either a first center line drawn in said one surface in parallel with a reference surface, or a second line drawn on said one surface which bisects said first center line in a direction perpendicular to said first center line;

an engagement protrusion formed in the other of said top and bottom surfaces and having a corresponding pattern engageable with said engagement recess; and a mark, provided on the top surface of said housing case, for indicating a direction in which a cassette is housed within the cassette housing case.

8. The cassette housing case as set forth in claim 7, further comprising a label area.

9. The cassette housing case as set forth in claim 7, wherein said engagement protrusion comprises a plurality of protruding portions.

10. The cassette housing case as set forth in claim 7, wherein said cassette housing case is formed from transparent or semitransparent material.

11. The cassette housing case as set forth in claim 7, wherein said engagement recess and said engagement protrusion are each formed into the shape of a substantially isosceles triangle.

12. The cassette housing case as set forth in claim 7, wherein said mark is substantially triangular in shape.

* * * * *